(12) United States Patent
Tonner

(10) Patent No.: US 7,836,761 B2
(45) Date of Patent: Nov. 23, 2010

(54) IMMERSION THERMOWELL FOR TEMPERATURE AND WATER LEVEL SENSING

(76) Inventor: Robert Brian Tonner, 1590 Greenmount Street, Pickering, ON (CA) L1X 2H9

( * ) Notice: Subject to any disclaimer, the term of this patent is extended or adjusted under 35 U.S.C. 154(b) by 33 days.

(21) Appl. No.: 12/027,804

(22) Filed: Feb. 7, 2008

(65) Prior Publication Data

US 2009/0199634 A1   Aug. 13, 2009

(51) Int. Cl.
   *G01F 23/00*   (2006.01)
(52) U.S. Cl. ....................................................... 73/295
(58) Field of Classification Search ................... 73/295
   See application file for complete search history.

(56) References Cited

U.S. PATENT DOCUMENTS

| 4,263,587 | A | | 4/1981 | John |
| 4,958,938 | A | * | 9/1990 | Schwartz et al. ............ 374/208 |
| 5,111,691 | A | * | 5/1992 | John et al. ..................... 73/292 |
| 5,178,009 | A | | 1/1993 | Arekapudi et al. |
| 5,260,667 | A | * | 11/1993 | Garcia-Golding et al. .. 73/61.44 |
| 6,352,361 | B1 | * | 3/2002 | Nimberger et al. ......... 73/866.5 |
| 6,543,283 | B2 | | 4/2003 | Acht et al. |
| 2006/0152225 | A1 | * | 7/2006 | Thomson .................... 324/446 |
| 2007/0253463 | A1 | | 11/2007 | Perry et al. |

FOREIGN PATENT DOCUMENTS

JP   60049224   3/1985

OTHER PUBLICATIONS

NEFI Magazine, Jan. 2008, advertisement for Hydrolevel Electrowell.

* cited by examiner

*Primary Examiner*—Hezron Williams
*Assistant Examiner*—Alex Devito

(57) ABSTRACT

An immersion thermowell with an electrically isolated sensor tube allows for ready conduction of heat energy to a temperature sensor probe. An electrical signal originating on the fluid container chassis can be conducted into the water, which can then be conducted to the electrically isolated thermowell tip and the signal can be made available to control apparatus.

7 Claims, 6 Drawing Sheets

IMMERSION THERMOWELL FOR TEMPERATURE AND WATER LEVEL SENSING

BACKGROUND OF THE INVENTION

The present invention relates in general to simultaneous measurement of liquid temperature and liquid level in boilers for hot water and steam heating.

Immersion thermowells are commonly used to provide a ready means to place temperature sensors in thermally conductive relationship with the liquid in boilers and other liquid vessels. Immersion thermowells are typically supplied with most residential heating boilers and are designed to mount temperature regulating and indication controls to the boilers, as well as offering temperature sensing orifices in the boiler. It is well know by those skilled in the art that immersion thermowells provide a simple means to place sensors in thermal relationship with the fluid in the boiler but also allows easy removal for service without the need to drain the boiler which can be a time consuming and cumbersome task.

Liquid level sensors are not commonly provided by boiler manufacturers due to the significant added cost but are becoming more popular as various US states legislate their use. Specifically, liquid level sensors are used in conjunction with low water cut off limit controls to prevent the boiler from firing when the water level falls below a safe level.

Boiler manufacturers normally do not provide level sensing devices since some states do not require their use. Therefore the installation of low water cut-off controls is typically left to the installer where they are required or desired. The installer may be required to bore holes in the wall of the boiler to provide access to the water, or more commonly will complete the labour-intensive task of routing external piping in the heating system specifically to allow a low water cut-off control to be installed. Homeowners in states not legislating their use are more inclined not to have one installed due to the high cost of installation, despite the obvious added safety that is offered.

In the North America boiler temperature limit controls are subject to the same UL and CSA safety standard as boiler level controls. Since they are subject to the same standard and essentially provide the same function to enable or disable the burner it would be efficient to offer a single control to boiler manufacturers that incorporated both functions in one device. Since virtually all boiler temperature controls mount to immersion thermowells that are designed to only allow thermal conduction of water temperature but preventing the sensors from coming in direct contact with the water it is not practical to provide level sensing means through the immersion thermowells currently available.

The Arekapudi U.S. Pat. No. 5,178,009 discloses an integral temperature and liquid level sensor and control that effectively provide such a solution, but Arekapudi teaches a combination sensor that is permanently fixed to the vessel wall.

John, in U.S. Pat. No. 5,111,691 also provides a single sensor control apparatus that combines liquid level and temperature measurement but also requires the sensor to be mounted directly in the sidewall of the boiler in direct contact with the fluid.

Perry in US patent application publication # 2007/0253463 discloses a means to detect fluid conductivity but requires a plurality of sensors spaced some distance apart.

In U.S. Pat. No. 4,859,076 Twerdochlib discloses a split thermowell for water and steam detection that uses dual temperature sensors and a heating element to detect the presence of water in vessel.

SUMMARY OF THE INVENTION

Accordingly it is therefore an object of the present invention to provide an immersion thermowell to allow for simultaneous measurement of liquid temperature and liquid level in vessels without direct contact between the sensors and the liquid.

It is a further object of the present invention to provide an immersion thermowell to allow for either measurement of liquid temperature or liquid level in vessels without direct contact between the sensors and the liquid.

It is yet another object of the present invention to provide a means to allow for easy insertion and removal of sensors in communicating relationship with the liquids in boilers.

DESCRIPTION OF THE DRAWINGS

Other objects and advantages will become apparent to those skilled in the art as this specification of the invention is disclosed in detail with reference to the drawings in which like numerals have been used to designate like elements throughout and wherein.

DETAILED DESCRIPTION OF THE PREFERRED EMBODIMENTS

Figure 1:
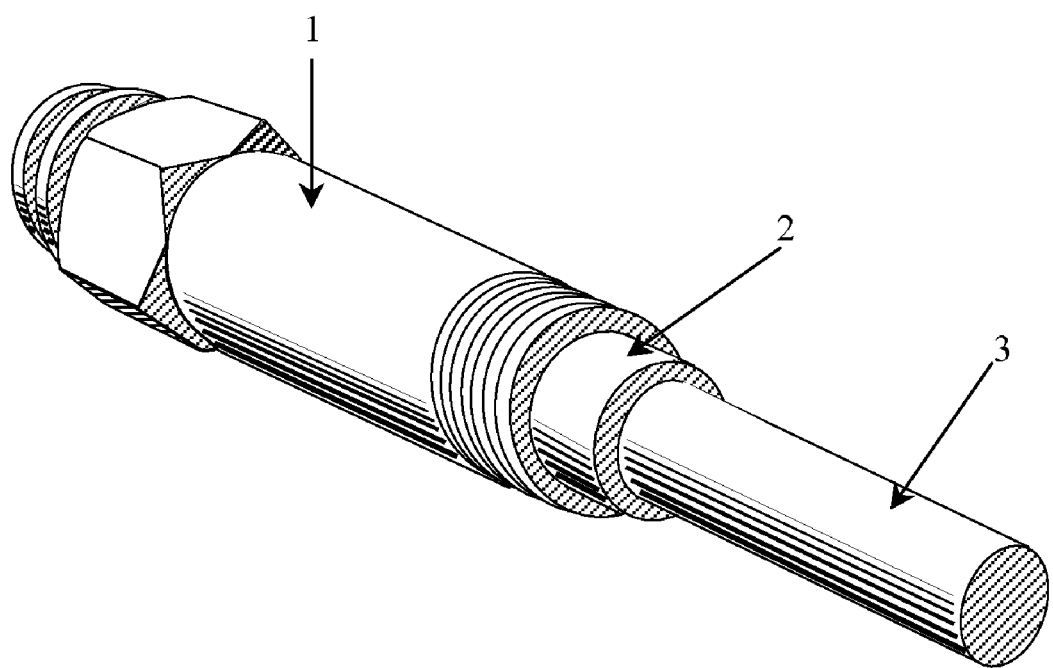
FIG. 1 is a three-dimensional diagrammatic representation of the preferred embodiment of the present invention.

Now, with reference to FIG. 1 there is disclosed the preferred embodiment of the present invention. Electrically conductive housing shell 1 is coaxially joined to electrically insulating collar 2, which is in turn coaxially joined to electrically and thermally conductive sensor tube 3. In the preferred embodiment housing shell 1 is constructed by lathe-turned brass or similar metal known to those skilled in the art, while collar 2 is formed from a suitable plastic or ceramic material. Sensor tube 3 is formed from copper, brass or some other suitable material that exhibits thermal and electrically conductive characteristics.

Figure 2:
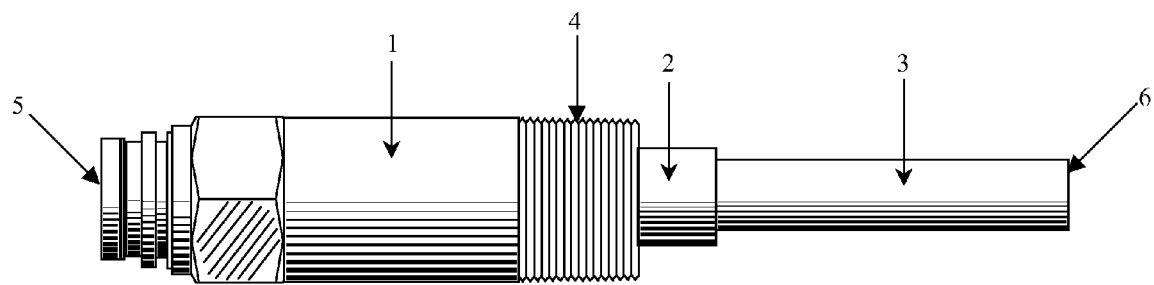
FIG. 2 is a side view, diagrammatic representation of the preferred embodiment of the present invention.

Turning to FIG. 2, a side view of a preferred embodiment, discloses housing shell 1 with annular pipe thread 4 in a position intermediate to first end 5 and second end 6. Collar 2 is coaxially joined to housing shell 1 so that collar 2 extends beyond housing shell 1 to a point intermediate housing shell 1 and second end 6.

Figure 3:
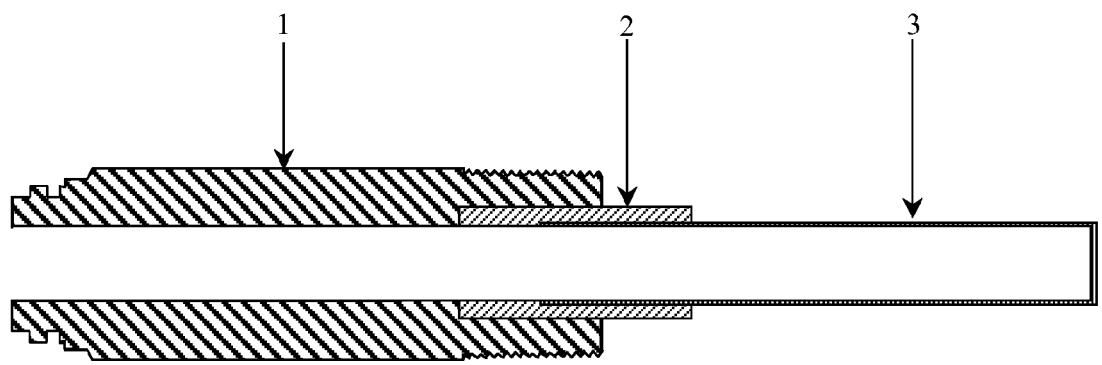
FIG. 3 is a cross sectional view diagrammatic representation of the preferred embodiment of the present invention.

Now turning to FIG. 3 there is disclosed a cross sectional view of the preferred embodiment of the present invention. Collar 2 is coaxially joined to housing 1 with the mating surfaces only maintaining contact to a point intermediate the axial length of housing 1. Sensor tube 3 is likewise coaxially joined to collar 2 with the mating surfaces only maintaining contact to a point intermediate the axial length of collar 2. Bonding of mating surfaces may be with cement, friction or another method well known to those skilled in the art.

Figure 4:
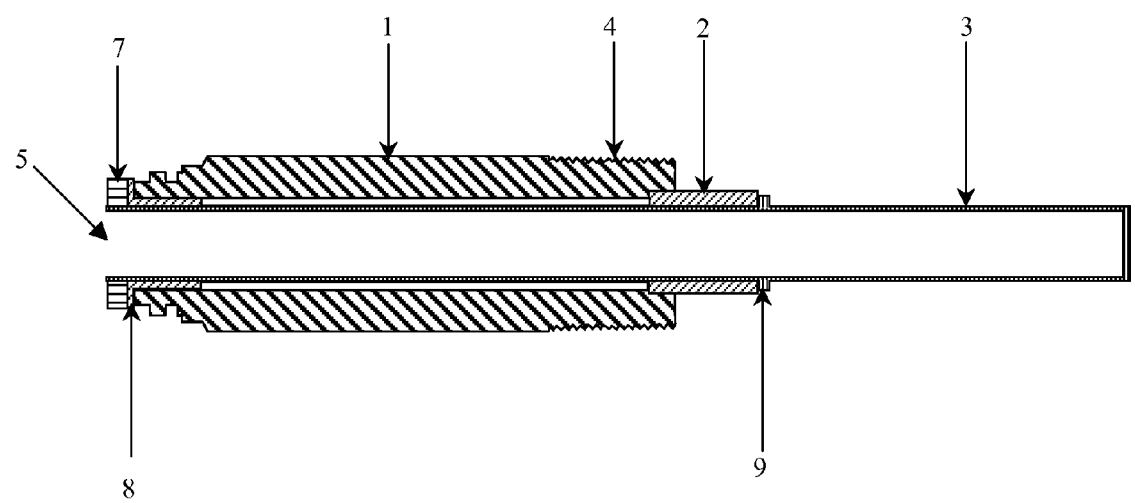
FIG. 4 is a cross sectional view diagrammatic representation of another preferred embodiment of the present invention.

FIG. 4 discloses a cross sectional view of another preferred embodiment of the present invention. Collar 2 is formed from mildly flexible material such as nylon or some other suitable plastic known to those skilled in the art. Collar 2 is coaxially joined to housing 1 with the mating surfaces only maintaining contact to a point intermediate the axial length of housing shell 1. Sensor tube 3 is coaxially joined to collar 2 and extends to first end 5. A second collar 9 electrically isolates sensor tube 3 from housing shell 1 and further electrically isolates retaining nut 7 from housing shell 1. Retaining nut 7 is threaded onto sensor tube 3 to cause flange 9 to compress collar 2 forming a watertight seal.

Figure 5:
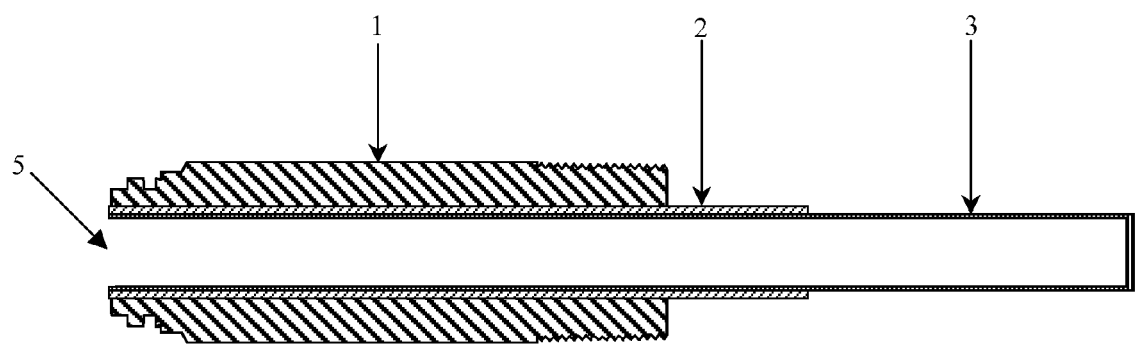
FIG. 5 is a cross sectional view diagrammatic representation of yet another preferred embodiment of the present invention.

Now turning to FIG. 5 there is disclosed a cross sectional view another preferred embodiment of the present invention. Collar 2 is coaxially joined to housing shell 1 with the mating surfaces maintaining contact the entire axial length of housing shell 1 to first end 5. Sensor tube 3 is likewise coaxially joined to collar 2 with the mating surfaces maintaining contact the entire axial length of collar 2 to first end 5. Bonding of mating surfaces may be with cement, friction or another method well known to those skilled in the art.

Figure 6:
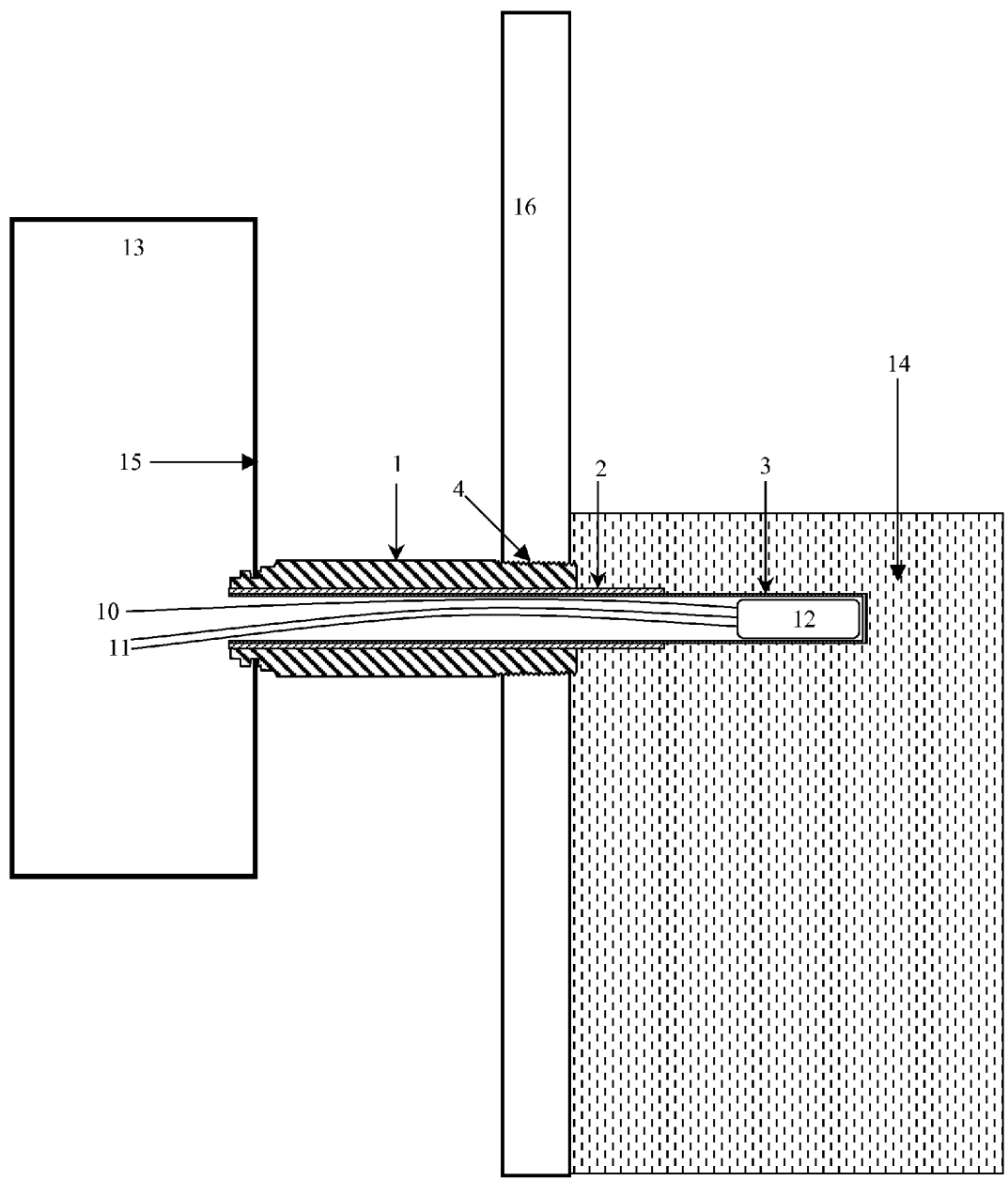
FIG. 6 is a cross sectional view diagrammatic representation of the preferred embodiment of the present invention in a typical boiler application.

Lastly, turning to FIG. 6 there is disclosed a cross sectional view of the preferred embodiment of the present invention in a typical boiler application showing apparatus external to the present invention. Housing shell 1 is threaded into boiler wall 16 by way of annular pipe threads 4. Collar 2 and sensor tube 3 are shown immersed in boiler fluid 14. Control apparatus 13 injects a fluid conductivity signal into control enclosure 15, which conducts said fluid conductivity signal into housing shell 1. Housing shell 1 conducts said fluid conductivity signal into boiler wall 16, which further conducts fluid conductivity signal into boiler fluid 14. When boiler fluid 14 is at a level that immerses sensor tube 3 said fluid conductivity signal is conducted through boiler fluid 14 into sensor tube 3 to integrated temperature and level sensor 12. Said fluid conductivity signal is conducted through level signal carrying means 10 to control apparatus 13. The temperature of boiler fluid 14 is conducted through sensor tube 3 to sensor 12. An electrical signal indicative of temperature of boiler fluid 14 is conducted from sensor 12 through temperature signal conduction means 11 to control apparatus 13.

While the preferred embodiments of the present invention have been disclosed and illustrated, the invention should no be limited thereto, but may be otherwise embodied within the scope of the above claims.

I claim:

1. An immersion thermowell adapted for mounting to the wall of a vessel, adapted to isolate a sensor from contact with liquid in said vessel, said sensor remaining in a thermal and electrical communicating relationship with said liquid, further adapted to allow a probe to measure thermal and electrical properties of said liquid, comprising: an electrically conductive housing shell coaxially joined to an electrically insulating collar coaxially joined to an electrically and thermally conductive sensor tube, forming a generally cylindrical chamber extending coaxially within, and having first and second ends, the first end being open and the second end being sealed, said sensor tube having a generally smooth exterior surface and said sensor tube being electrically isolated from said housing shell by said collar.

2. An immersion thermowell set forth in claim 1 comprising a mounting means integrally formed on the surface of said housing shell, in a circumferential portion thereof of limited axial extent intermediate the first and second ends.

3. An immersion thermowell with mounting means set forth in claim 2 comprising an annular pipe thread integrally formed in said circumferential portion of said housing shell.

4. An immersion thermowell set forth in claim 1 wherein the junction of said housing shell and said collar are sufficiently sealed to prevent liquid ingress when exposed to fluid pressures typical of boiler vessels.

5. An immersion thermowell set forth in claim 1 wherein the junction of said collar and said sensor tube are sufficiently sealed to prevent liquid ingress when exposed to fluid pressures typical of boiler vessels.

6. An immersion thermowell set forth in claim 1 wherein said collar is coaxially joined to said housing shell so that said collar extends axially beyond said housing shell to a point intermediate said housing shell and said second end.

7. An immersion thermowell set forth in claim 1 wherein said sensor tube is coaxially joined to said collar so that said sensor tube extends axially beyond said collar to said second end.

* * * * *